United States Patent [19]
Martens

[11] Patent Number: 5,339,924
[45] Date of Patent: Aug. 23, 1994

[54] LUBRICATING MECHANISM INCLUDING A DOSING DEVICE FOR LUBRICANT, ESPECIALLY FOR AN AIRCRAFT

[75] Inventor: Wilhelm Martens, Delmenhorst, Fed. Rep. of Germany

[73] Assignee: Deutsche Aerospace Airbus GmbH, Hamburg, Fed. Rep. of Germany

[21] Appl. No.: 44,220

[22] Filed: Apr. 7, 1993

[30] Foreign Application Priority Data

Apr. 9, 1992 [DE] Fed. Rep. of Germany ....... 9204930

[51] Int. Cl.⁵ .............................................. F16N 11/10
[52] U.S. Cl. .................................... 184/40; 184/7.4; 184/29; 184/39; 184/105.1; 184/105.2; 184/109; 222/249; 222/389
[58] Field of Search .................. 184/7.4, 6.4, 105.1, 184/105.2, 108, 29, 39, 40; 222/389, 386, 249

[56] References Cited
U.S. PATENT DOCUMENTS

| | | | |
|---|---|---|---|
| 1,997,406 | 4/1935 | Hills | 222/249 |
| 2,742,197 | 4/1956 | Walsh | 222/380 |

FOREIGN PATENT DOCUMENTS 1138657 10/1962 Fed. Rep. of Germany ...... 222/249

Primary Examiner—Thomas E. Denion
Attorney, Agent, or Firm—W. G. Fasse; W. F. Fasse

[57] ABSTRACT

A dosing device for a lubricating mechanism is constructed for discharging a measured volume of lubricant into a component to be lubricated, such as a rotary gear box in an aircraft. For this purpose the dosing device has a housing with a defined volume in which a piston is movable in an axial direction to define two chambers. The end walls of the housing are connected through quick coupling connectors to a lubricant supply and to the component to be lubricated. The device operates in such a way that the filling of one chamber with lubricant under pressure pushes the piston, and thus the lubricant in the other chamber, out into the component to be lubricated. Thus, always a precisely measured volume of lubricant is discharged from one chamber while the same volume is being filled into the other chamber and vice versa. A coupling adapter may be used for a quick reversal.

12 Claims, 2 Drawing Sheets

LUBRICATING MECHANISM INCLUDING A DOSING DEVICE FOR LUBRICANT, ESPECIALLY FOR AN AIRCRAFT

FIELD OF THE INVENTION

The invention relates to a mechanism for dosing defined quantities of a lubricant. Such devices are used generally for lubricating purposes, but particularly for lubricating gear drives in an aircraft such as rotary drives for operating a flap in an aircraft wing and/or in a tail section.

BACKGROUND INFORMATION

Conventional lubricating devices, such as grease guns, do not provide a precisely measured volume of lubricant. It is merely possible to develop by experience a knowledge of how much lubricant is discharged with each pull of the trigger. However, it is important that precisely measured quantities of lubricant are supplied to certain equipment such as the drives for the control surfaces and flaps in the wing and tail section of an aircraft. A precisely dosed discharge of lubricant is especially important in those instances where the conventional spindle drives have been replaced by so-called rotary gear drives. Such rotary gear drives are enclosed in a housing, but due to their required construction lubricant is discharged outwardly and moisture and contaminations can enter into the housing of the rotary gear. Further, such rotary gear drives are constructed to have a working life typically within the range of ten to twenty years without the need for a complete overhaul. In order to ensure such a life span while avoiding a complete overhaul, it is important that a precise quantity of lubricant is periodically replaced. The precise dosing is necessary, especially with regard to changes in the viscosity of the lubricant in response to temperatures. In other words, over-filling of the gear boxes of such rotary gear drives must be avoided.

The foregoing precise supply of a lubricant quantity or rather volume has not been satisfactorily solved heretofore. Such devices must provide not only an exact dosing, but must also be highly efficient in their use so that a multitude of sequential lubricating operations can be efficiently performed.

OBJECTS OF THE INVENTION

In view of the foregoing it is the aim of the invention to achieve the following objects singly or in combination:

to provide a dosing device for a lubricating mechanism to enable the discharge of a measured volume of a lubricant, whereby a plurality of lubrication operations can be performed in sequence quickly and efficiently;

to construct the dosing device so that it contains at least two precisely defined volumes for holding lubricant; and to construct the dosing device as a repeatedly usable cartridge that can be refilled, whereby each end of the cartridge is connectable to a lubricant supply or to a lubricating nipple, either directly or through an adapter.

SUMMARY OF THE INVENTION

The lubricating device according to the invention is characterized by a housing that holds an axially movable piston which divides the inner volume of the housing into two chambers of precise volumes which are equal to each other if the piston is positioned centrally within the housing, and which may differ from each other when the piston is located off-center toward one or the other end of the housing. Same type quick coupling connectors are connected to each housing end, preferably centrally to each end wall. Preferably, each quick coupling connector can be selectively connected either to a supply source for lubricant, such as a grease gun, or to a lubricating nipple and vice versa. Thus, each quick coupling connector functions as a filling connector or as a discharge connector either directly or through an adapter.

This construction makes it possible to simultaneously fill one chamber with lubricant while the other chamber is discharging and vice versa. Initially, the piston in the housing will be located at one end of the housing so that one chamber volume will be zero, while the other chamber volume will contain the dosed quantity of lubricant. The quick coupling connector leading into the chamber that is empty will now be connected, for example, to a grease gun and the other quick coupling connector leading into the full chamber will be connected to a lubricating nipple. As pressurized lubricant from the grease gun gradually fills one chamber, the other chamber will be gradually emptied until the piston has reached the opposite end of the housing. For the next cycle, the operation is the same, but reversed in that now the chamber that has just been emptied will be refilled and the chamber that has been filled during the previous emptying of the other chamber will now be emptied.

For the just described operation it is desirable that the position of the piston within the housing should be known to the operator. This could, for example, be accomplished by a pressure gage that would indicate a sudden pressure increase when the piston has reached an end position. However, it is also possible to make the housing either of transparent material, or provide an opague housing with a wall section that is transparent along the length of the housing. Additionally, it is preferable that the quick coupling connectors are suitable for connection to a grease gun and/or to a lubricating nipple. Depending on the type of output of the grease guns and lubricating inputs, the quick coupling connectors may be of the male or female type.

The interior of the housing may be constructed for accepting a specific type of lubricant, such as a highly viscous lubricating grease, or a liquid lubricant, or even a gaseous lubricant.

The present dosing device for lubricant is especially useful in the maintenance work of aircraft, particularly those where rotary drives or rotary gears are used for the operation of control surfaces and flaps. Therefore, the volume of the present dosing device is preferably selected to correspond to the lubricant volume required for these rotary gear drives.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
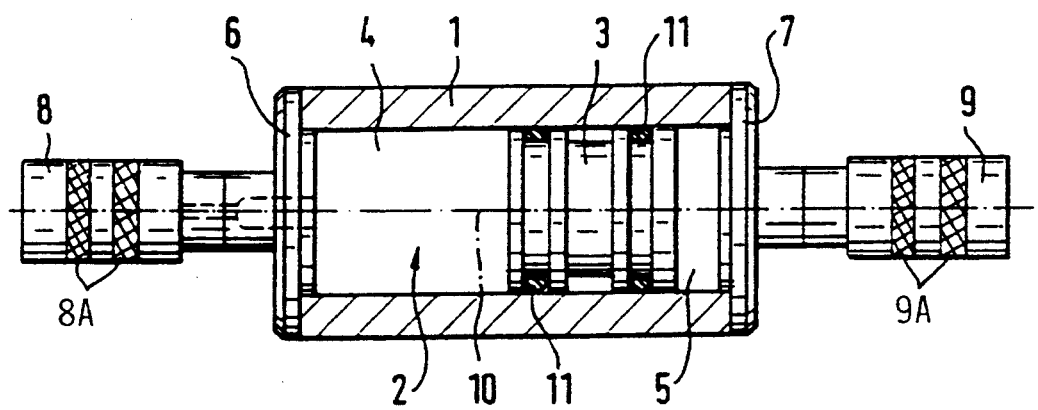
FIG. 1 is an elevational view, partially in section, of the dosing device according to the invention, equipped with two quick coupling connectors.

FIG. 1 shows the present dosing device which comprises a housing 1 enclosing a housing volume 2 divided by an axially movable piston 3 into two chambers 4 and 5. Preferably, the housing volume 2 is cylindrical. However, the invention is not limited to a cylindrical configuration. The housing ends are closed by end walls 6 and 7 connected to quick coupling connectors 8 and 9 respectively. The piston 3 is movable back and forth within the volume 2 along the central axis 10 depending on the pressure in the chambers 4 and 5.

At least one, preferably two, sealing rings 11 are provided in respective grooves of the piston 3 to seal chambers 4, 5 from each other.

The coupling connectors 8 and 9 are of the conventional quick coupling type, whereby preferably at least one quick coupling connector is adapted to be connected to a source of lubricant, such as a grease gun, or to the component to be lubricated. These connectors may be of the male and/or female type, and if necessary, an intermediate adapter may be used as will be explained with reference to FIG. 2. each adapter is provided on its outer surface with a roughened or knurled portion to provide a good grip for a quick decoupling and coupling.

Figure 2:
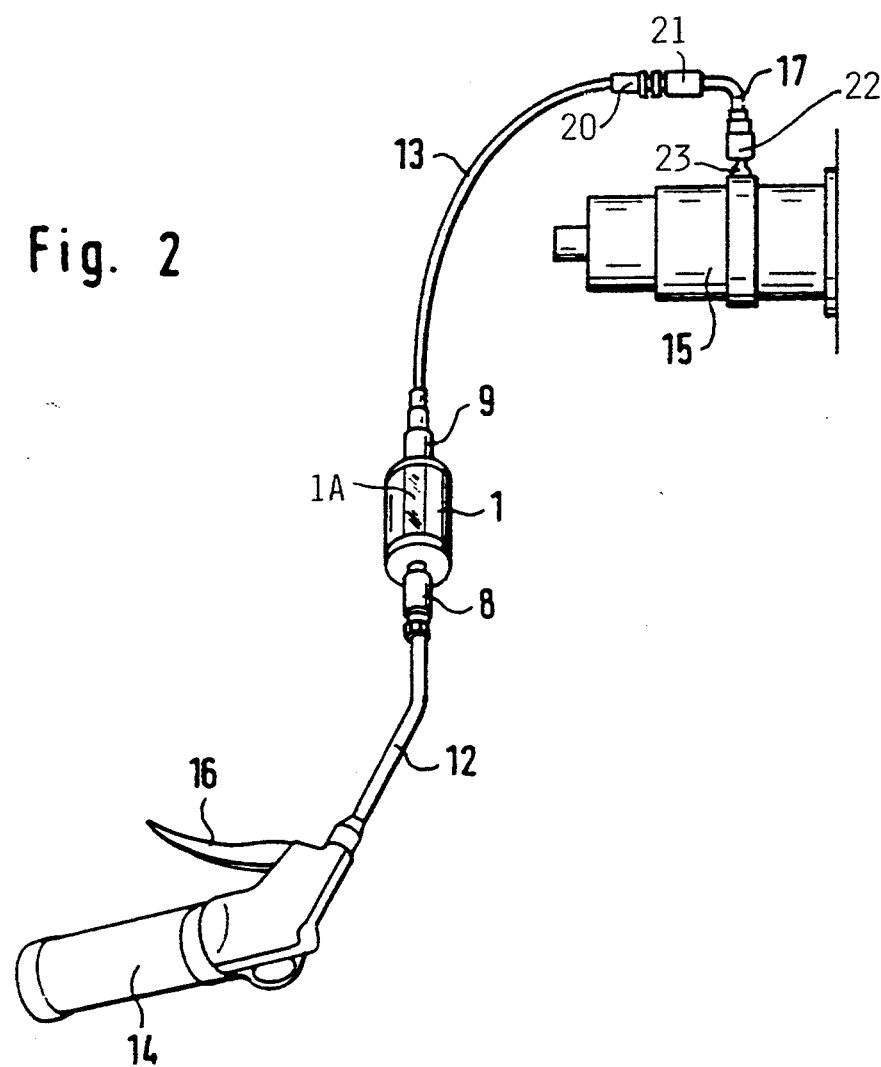
FIG. 2 illustrates the present dosing device connected simultaneously to a grease gun and to a component to be lubricated.

FIG. 2 shows the dosing device 1 with a housing that is at least partially transparent as shown at 1A to indicate to an operator the position of the piston 3 within the volume 2 along the length between the two end walls. Further, the quick coupling connector 8 is connected through a pipe 12 to the discharge nozzle of a grease gun 14 having a conventional trigger 16. The quick coupling connector 9 is connected through an adapter pipe 13 and its own quick coupling connector 20, to an adapter connector 21 of an angled or L-pipe section 17 which in turn is connectable through a quick coupler 22 to a lubricating nipple 15A of a component 15 to be lubricated, such as a rotary gear drive in the wing of an aircraft for adjusting the position of control surfaces or the like. The use of a rigid L-pipe section 17 is preferred in those instances where a flexible pipe section might kink. If the pipe section 17 is rigid, the pipe sections 12 and 13 are preferably flexible. Instead of the pipe sections 13 and 17 performing the function of an adapter between the respective quick coupling connector and the component to be lubricated, the pipe section 12 could perform an adapter function.

Figure 3:
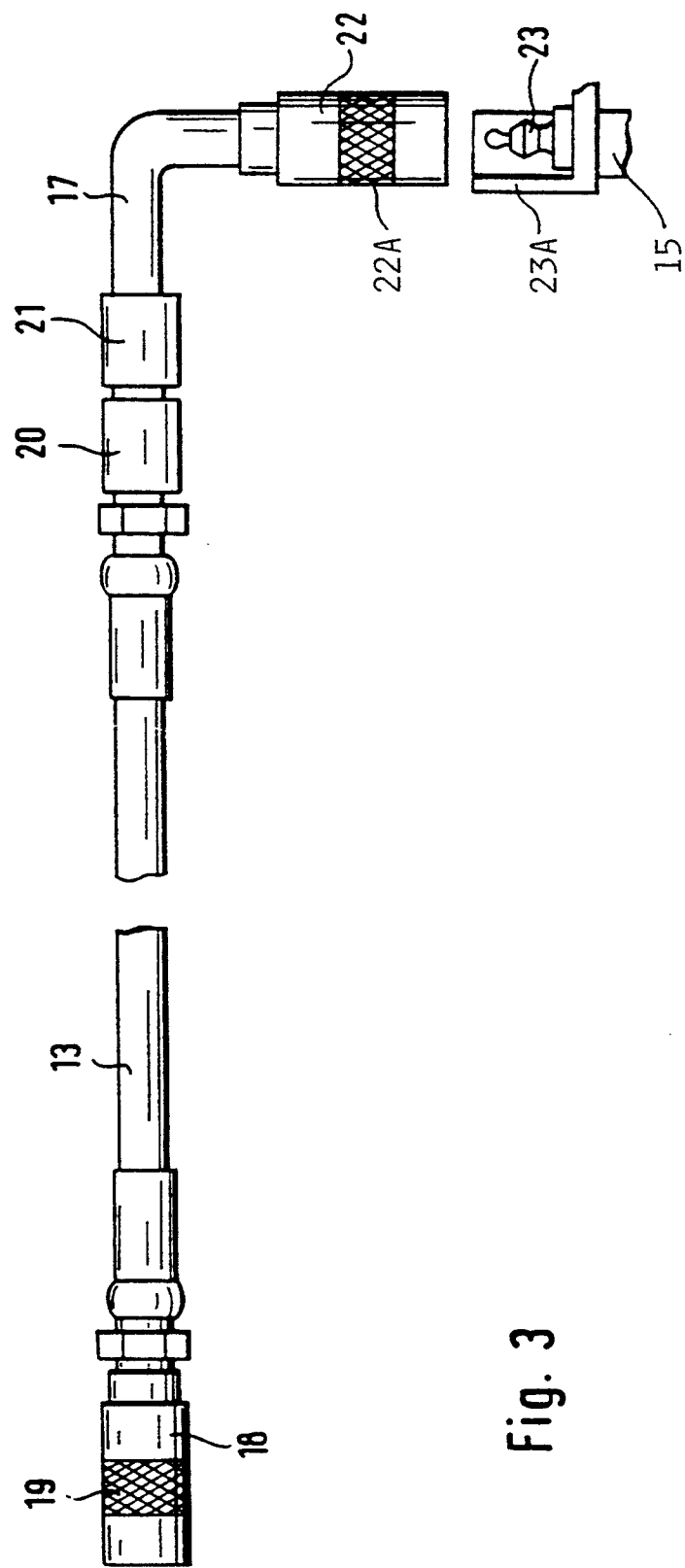
FIG. 3 illustrates on a somewhat enlarged scale, pipe sections equipped with quick coupling connectors for use in combination with the present dosing device, as an adapter.

FIG. 3 shows further details of the adapter pipe section 13. Assuming that the quick coupling member 9 is a female connector, then one end of the pipe section 13 is provided with a male quick coupling connector 18 having an external sealing packing 19 fitting in a sealing manner into the female connector 9. The L-pipe section 17 is provided with a coupling member 22 that fits onto the nipple 23 of the device 15 to be lubricated. A knurled section 22A on the surface of the connector 22 facilitates a good grip to make the coupling and decoupling quickly.

The coupling elements 20, 21, 22 are also of conventional so-called quick coupling construction. The nipple 23 functions as a valve to permit entry of lubricant under pressure into the component 15 to be lubricated. Preferably, the nipple 23 is mounted in socket 23A into which the coupling connector 22 fits with a good seal. The valve function of the nipple 23 also prevents the entry of contaminations into the component 15.

The interior of the dosing device and of the respective couplings and adapters can be constructed for various types of lubricants, such as lubricant grease, liquid lubricants, and even gaseous lubricants.

The housing 1 could either be made entirely of a transparent material, such as a transparent plastics material, for example Plexiglass ® or the like, or a section 1A could be made of such material to show the position of the piston 3 within the housing 1.

A plurality of cartridges with different volumes formed by dimensioning the present housing 1 accordingly may be filled and kept in stock to permit a rapid lubricating job of different aircraft components requiring different volumes of lubricant.

Although the invention has been described with reference to specific example embodiments it will be appreciated that it is intended to cover all modifications and equivalents within the scope of the appended claims.

What I claim is:

1. A dosing device for a lubricating mechanism for discharging a measured volume of lubricant into a component to be lubricated, comprising a housing for holding lubricant, a piston slidably mounted for an axial movement in said housing and dividing said housing into first and second chambers, and a seal closing off said first and second chambers from each other, each chamber having a variable volume that increases in one chamber when the volume in the other chamber decreases and vice versa depending on the movement of said piston in said housing, wherein pressing lubricant into one chamber empties lubricant out of the other chamber and vice versa, a first quick coupling connector secured to one end of said housing for communicating with said first chamber, a second quick coupling connector secured to the other end of said housing for communicating with said second chamber, and wherein said first and second quick coupling connectors are of the same construction so that each is adapted to be connected to a supply source of lubricant and to said component to be lubricated and vice versa, so that one of said chambers is being filled with a determined volume of lubricant when said one chamber is connected to a source of lubricant under pressure while the other chamber is being emptied into said component to be lubricated and vice versa, whereby each quick coupling connector functions sequentially as inlet and outlet for lubricant.

2. The lubricating mechanism of claim 1, wherein said housing comprises first and second end walls each closing a respective housing end, said first and second quick coupling connectors being secured axially and centrally to said first and second end wall respectively for communicating with said first and second chambers respectively.

3. The lubricating mechanism of claim 1, wherein both quick coupling connectors are adapted for coupling to a grease gun for sequentially filling said chambers with lubricant.

4. The lubricating mechanism of claim 1, wherein both quick coupling connectors are adapted for coupling to said component to be lubricated.

5. The lubricating mechanism of claim 1, wherein said seal comprises at least one sealing ring (11) on said piston for sealing said first and second chambers from each other.

6. The lubricating mechanism of claim 1, wherein said first and second chambers are constructed for containing grease as a lubricant.

7. The lubricating mechanism of claim 1, wherein said first and second chambers are constructed for containing a liquid lubricant.

8. The lubricating mechanism of claim 1, wherein said first and second chambers are constructed for containing gas as a lubricant.

9. The lubricating mechanism of claim 1, wherein said volume of each of said first and second chambers, as defined by an end position of said piston in said housing, corresponds to a lubricating volume of said component to be lubricated.

10. The lubricating mechanism of claim 9, wherein said component to be lubricated is a rotary drive for operating a flap in an aircraft wing or tail section.

11. The lubricating mechanism of claim 1, wherein said housing comprises means for indicating the position of said piston in said housing.

12. The lubricating mechanism of claim 11, wherein said means comprise at least a housing wall portion made of transparent material for revealing said piston position.

* * * * *